United States Patent [19]

Arai et al.

[11] 4,422,153
[45] Dec. 20, 1983

[54] OBLIQUE PROJECTION ORIGINAL AND OBLIQUE PROJECTION ORIGINAL FORMING APPARATUS AND METHOD

[75] Inventors: Yoshio Arai; Hiroyuki Kataoka; Nobuaki Endo, all of Ebina, Japan

[73] Assignee: Fuji Xerox Co., Ltd., Tokyo, Japan

[21] Appl. No.: 187,033

[22] Filed: Sep. 15, 1980

[30] Foreign Application Priority Data

Sep. 14, 1979 [JP] Japan ................................ 54-117362

[51] Int. Cl.³ ...................... G03B 21/00; G06F 15/20
[52] U.S. Cl. .................................. 364/525; 315/371;
353/69; 353/70; 358/60; 364/571; 382/54
[58] Field of Search ........................ 364/515, 525, 571;
315/371; 358/60, 231; 353/69, 70, 78; 382/54

[56] References Cited

U.S. PATENT DOCUMENTS

| | | | |
|---|---|---|---|
| 1,272,623 | 7/1918 | Comstock | 353/70 |
| 3,115,544 | 12/1963 | Marley | 353/78 |
| 3,963,337 | 6/1976 | Lundberg | 353/70 |
| 4,004,093 | 1/1977 | Oland | 358/60 |
| 4,194,216 | 3/1980 | Ohmuri | 358/60 |
| 4,210,929 | 7/1980 | Takabayashi | 315/371 |

OTHER PUBLICATIONS

Robertson; "Projection Television;" Wireless World, vol. 82, No. 1489, pp. 47–52; Sep. 1976.

*Primary Examiner*—Errol A. Krass
*Attorney, Agent, or Firm*—Sughrue, Mion, Zinn, Macpeak, and Seas

[57] ABSTRACT

An oblique projection original is formed by deforming an orthogonal projection original in such a manner that a rectangular original is transformed into a trapezoidal original by compressing the orthogonal projection original by thinning scanning lines in a horizontal direction. In addition, predetermined bits in each scanning line are thinned in a vertical direction, and each line is compressed by reducing first and last portions of each line by half the number of bits thus thinned. Finally, white bits are inserted at the first and last portions of each scanning line to complete each scanning line.

3 Claims, 9 Drawing Figures

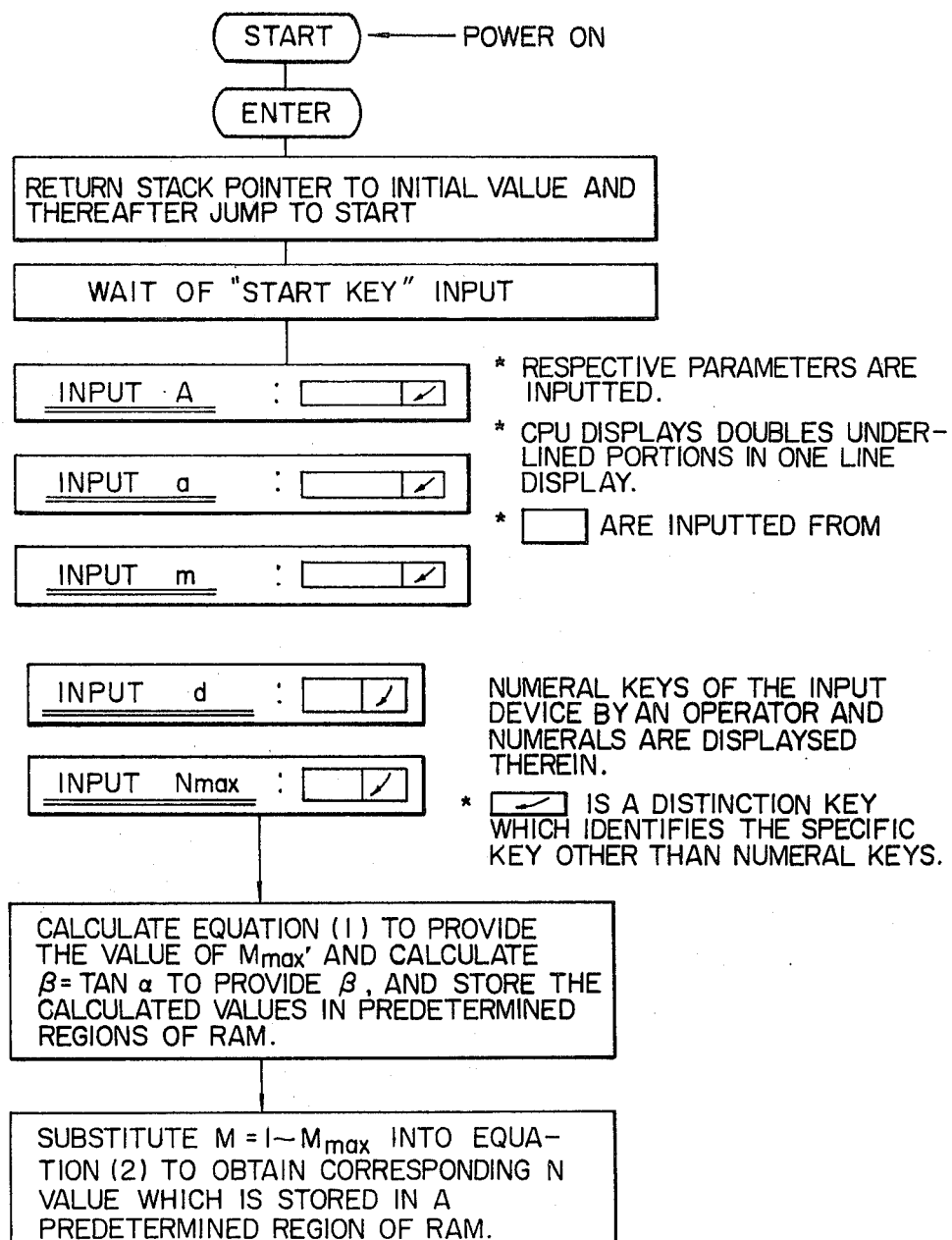

OBLIQUE PROJECTION ORIGINAL AND OBLIQUE PROJECTION ORIGINAL FORMING APPARATUS AND METHOD

BACKGROUND OF THE INVENTION

The present invention relates to a method for forming an oblique projection original such as a film which may be obliquely projected onto a screen with the projected image thereof equivalent to a corresponding orthogonal projection image, and to an apparatus for forming the oblique projection original.

An overhead projector (OHP) or a slide projector is known as an apparatus which applies light to a film original on which characters or pictures are provided to project the image thereof onto a screen. In order that the image of a film loaded in the projection apparatus may be orthogonally projected onto the screen, it is necessary that the surface of the film in the projection apparatus be parallel to the screen. However, as the operator or observer is positioned behind the projection apparatus, it is sometimes rather difficult to observe the image on the screen.

Accordingly, an object of this invention is to eliminate the above-described difficulty accompanying a conventional projection original. More specifically, an object of the invention is to provide a method for forming an oblique projecting original which may be obliquely projected on the screen, that is, with the screen inclined with respect to the original, and the resultant image on the screen is equivalent to an orthogonally projected image.

SUMMARY OF THE INVENTION

These, as well as other objects of the invention, are met by an oblique projection original formed by deforming an orthogonal projection original in such a manner that a rectangular original is deformed into a trapezoidal original by compressing the orthogonal projection original by thinning scanning lines in a horizontal direction, thinning predetermined bits in each line in a vertical direction, and compressing each line by reducing first and last portions of each line by as much as a half of the numbers of bits thus thinned.

Yet further, the objects of the invention can be met by an oblique projection original forming apparatus including first means for reading an orthogonal projection original in a main-scanning direction and in a sub-scanning direction; second means for determining, from at least one of the total number of read scanning lines and a projection inclination of the orthogonal projection original, read scanning line numbers to be used as oblique projection original data; third means for retaining only the data of read scanning lines having numbers which are determined by the second means; fourth means for determining an angle of inclination of the contour of the oblique projection original from the projection inclination; fifth means for determining the number of bits to be thinned from the data of each read scanning line according to the angle of inclination, the total number of retained read scanning lines, and the number of bits in a vertical direction of the orthogonal projection original; sixth means for eliminating a predetermined number of bits from the data of each read scanning line according to the determination of the fifth means; and seventh means for shifting the retained bits towards the center of each read scanning line and providing white bits in both end portions of the line to thereby complete each read scanning line.

DESCRIPTION OF THE PREFERRED EMBODIMENTS

Figure 1:
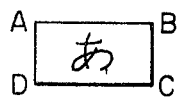
FIG. 1 is a plan view of an orthogonal projection original.
Figure 2:
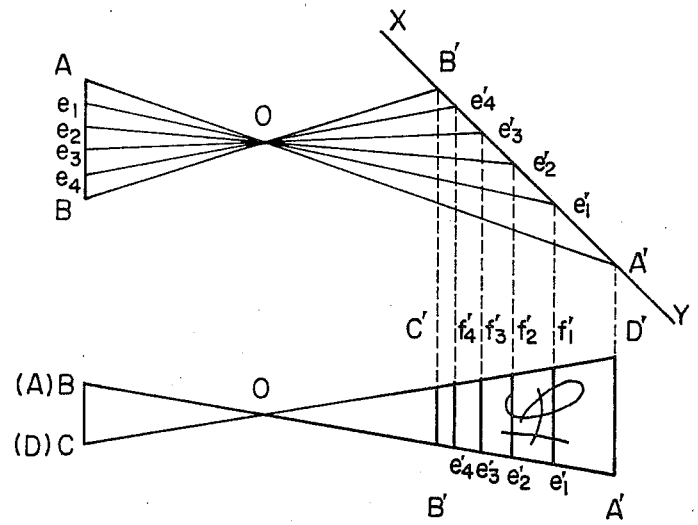
FIG. 2 is a diagram for a description of the oblique projection of an orthogonal projection original.

The relation between an ordinary orthogonal original and its image upon oblique projection is as follows. As an example, it is assumed that an orthogonal projection original is a rectangle ABCD as shown in FIG. 1. FIG. 2 shows the side AB of the original in FIG. 1 projected onto a screen XY. In FIG. 2, reference character O designates the center of a lens.

Equal length segments $Ae_1$, $e_1e_2$, $e_2e_3$, $e_3e_4$ and $e_4B$ on the original are projected onto the screen with different magnifications. As can be seen from the drawings, $A'e_1' > e_1'e_2' > e_2'e_3' > e_3'e_4' > e_4'B'$ and $A'D' > e_1'f_1' > e_2'f_2' > e_3'f_3' > e'f' > B'C'$. That is, the rectangular original ABCD is deformed into a trapezoidal image A'B'C'D' because of the oblique projection as shown in FIG. 2. Accordingly, in order that, for oblique projection, an image on the screen will appear without deformation as in the case of orthogonal projection, it is necessary to reverse the above-described process, that is, an original should be deformed before it is subjected to oblique projection.

Figure 3:
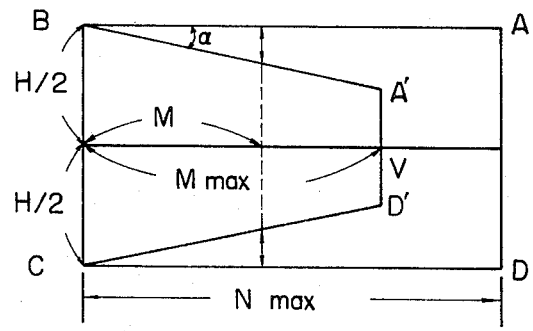
FIGS. 3 and 4 are diagrams for a description of the relation between an orthogonal projection original and an oblique projection original according to the invention.

In accordance with the invention, a method and apparatus is provided for deforming an original orthogonal image into a trapezoidal original A'BCD', as shown in FIG. 3, by compressing the original ABCD in the horizontal direction (in the direction of AB in FIG. 1) and thinning bits representing the picture image in the vertical direction (in the direction of AD in FIG. 1) according to the above-described technical concept. The invention also encompasses an apparatus for forming such an original.

A procedure of forming an oblique projection original according to the invention will be described with reference to FIGS. 3 and 4.

Figure 4:
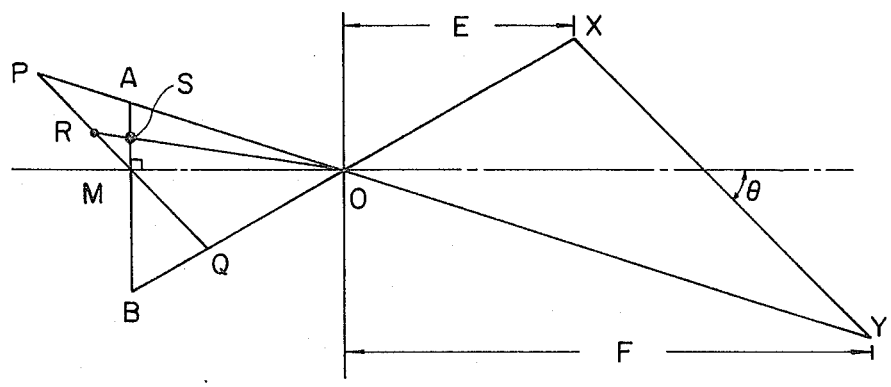

In FIG. 4, reference character O designates the center of a lens, AB an oblique projection original, PQ an orthogonal projection original, and XY a screen. Further in FIG. 4, reference character $\theta$ designates the inclination angle of the screen XY with respect to the original AB with $m = \tan \theta$. M represents the foot of a perpendicular extending from the center O to the original AB with $\overline{OM} = a$ and $\overline{AB} = A$. It is assumed that the main scan is in the directions of BC and A'D'.

A scanning line selecting equation for compressing the original in the horizontal (AB) direction will now be given. In FIG. 4, reference character S designates a point on the original AB, and R represents a point on the original PQ which corresponds to the point S. The relation between $\overline{SB}$ and $\overline{RQ}$ can be expressed with a, A and m as follows:

$$\overline{SB} = \frac{(2am - A)^2 \times \overline{RQ}}{2\{2a^2m\sqrt{1 + m^2} - (2am - A)\overline{RQ}\}}$$

If the reading line density of an original reading device is expressed by d, with coefficients M and N, then $$\overline{SB} = M \times d,$$

$$\overline{RQ} = N \times d,$$

$$M = \frac{(2am - A)^2 \times N}{2\{2a^2m\sqrt{1 + m^2} - (2am - A) \times N \times d\}}, \text{ and} \quad (1)$$

$$N = \frac{4a^2m\sqrt{1 + m^2} \times M}{(2am - A)(2am - A + 2 \times M \times d)} \quad (2)$$

The total number ($N_{max}$) of lines of the orthogonal projection original is known. The total number is substituted into equation (1) to obtain the total number of lines ($M_{max}$) in the oblique projection original. Then, the values N are calculated by successively substituting 1, 2, 3, ..., $M_{max}$ into M in equation (2). The results obtained by counting decimal fractions of 0.5 and over as a unit and by truncating decimal fractions less than 0.5 represent line numbers for the orthogonal projection original which are selected as data lines An equation for thinning bits in the vertical (BC) direction in a scanning line will be described below. The angle of inclination $\beta$ of the line A'B or CD' in FIG. 3 can be represented by the following equation:

$$\beta = \tan \alpha = (2am - A)/(2am + A).$$

Therefore, a half (G) of the total number of bits to be thinned in an M-th scanning line is:

$$G = \frac{M}{M_{max}} \times \frac{H}{2}(1 - \beta) \quad (3)$$

where H is the number of bits in the vertical direction of the orthogonal projection original.

It is assumed that the bits along a vertical scanning line are thinned at equal intervals. The bit interval $\Delta M$ at which the bits in the M-th line should be thinned is:

$$\Delta M = H/2G \quad (4)$$

The above-described original forming procedure according to the invention can be summarized as follows:

(a) The total number ($M_{max}$) of horizontal scanning lines of the oblique projection original is obtained by substituting the known total number ($N_{max}$) of horizontal scanning lines of the orthogonal projection original into equation (1).

(b) The horizontal selection lines of the orthogonal projection original are determined by substituting M = 1, 2, 3, ..., $M_{max}$ into equation (2).

(c) A half of the total number of bits to be thinned in the vertical direction in the orthogonal projection original is obtained from equation (3) for each scanning line. Then, the data at the bit positions provided by equation (4) are thinned. If the distance $\overline{OM} = a$ between the lens and the center of the original, and the size $\overline{AB} = A$ of the original are fixed, then the only variable affecting the formation of an oblique projection original is the projection inclination m.

Figure 5:
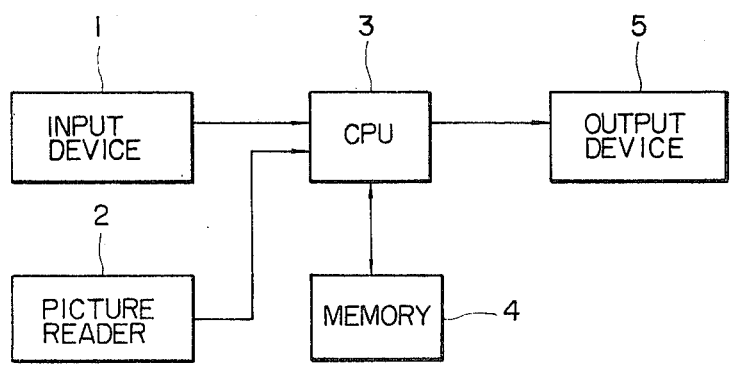
FIG. 5 is a block diagram showing an example of an oblique projection original forming apparatus constructed according to the invention.

FIG. 5 is a block diagram showing the arrangement of an apparatus of the invention for forming the above-described oblique projection original. The apparatus includes an input device 1, such as a ten-key unit, for inputting projection inclinations; a picture reader 2 for reading an orthogonal projection original line-by-line; a central processing unit (CPU) 3 for performing calculations in accordance with the above-described equations, thinning the bits, and performing control of the composite apparatus such as for instance timing control; a memory 4 for storing and processing data read by the picture reader 2 and for storing angle and numerical values needed for calculations; and an output device 5 for outputting the data of a line which has been read and processed and to effect a printout of the data.

Figure 6:
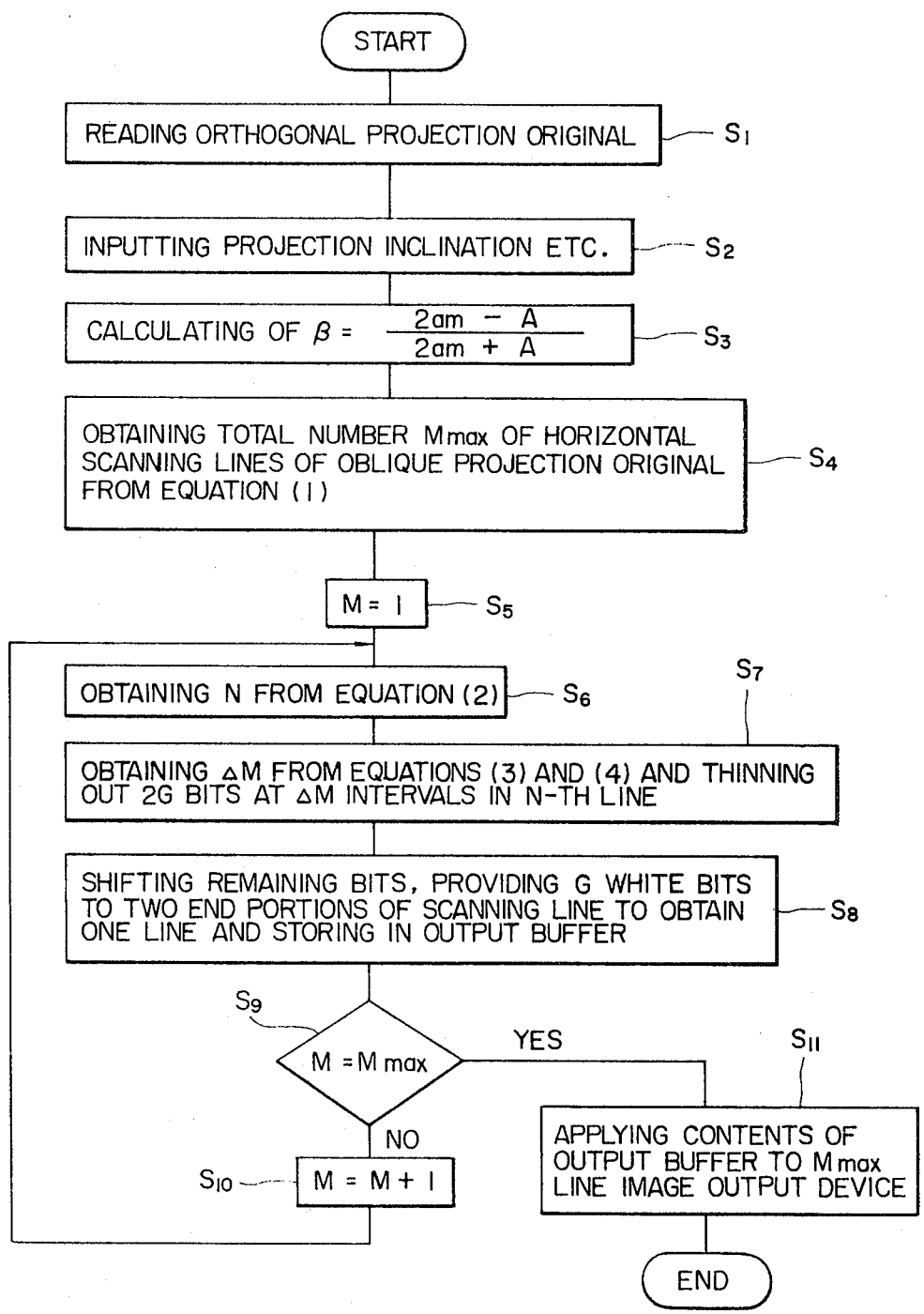
FIG. 6 is a flow chart showing the operation of the apparatus shown in FIG. 5.

A procedure for forming an oblique projection original from an orthogonal projection original using the system shown in FIG. 5 is indicated by the flow diagram of FIG. 6.

$S_1$ .... The orthogonal projection original is read by the picture reader 2 with H bits per scanning line in the vertical (main-scanning) direction and with the total line number ($N_{max}$) in the horizontal (sub-scanning) direction.

$S_2$ .... The input device 1 is used to input $\overline{AB} = A$. $\overline{OM} = a$ (FIG. 4); where $\theta$ is a projection inclination angle; m = tan $\theta$ and a reading line density d.

$S_3$ ... $\beta = \tan \alpha = (2am - A)/(2am + A)$ is calculated.

$S_4$ ... the values a, m, A, d and $N_{max}$ are used in numerically evaluating equation (1) to obtain the total number ($M_{max}$) of horizontal scanning lines of the oblique projection original corresponding to $N_{max}$.

$S_5$-$S_6$ .... With M = 1, the corresponding value of N is obtained from equation (2).

$S_7$ .... The value G obtained from equation (3) is used to evaluate equation (4) to calculate the bit interval $\Delta M$. Bits in the N-th line are thinned at the $\Delta M$ intervals. The number of bits to be thinned is 2G.

$S_8$ .... The data bits remaining in the N-th line are successively shifted toward the center of the line and G white bits are provided in two end positions of the scanning line. The data bits for one line thus obtained are outputted as those of the N-th line and stored in a predetermined position in an output buffer.

$S_9$-$S_{10}$ .... A determination is made as to whether or not M has reached $M_{max}$. If not, 1 is added to M to obtain (M + 1) and the above-described steps $S_6$ through $S_8$ are repeated. Once M reaches $M_{max}$, then in step $S_{11}$ the contents of the output buffer are applied to the output device. At that point, the procedure has been completed.

Figure 7:
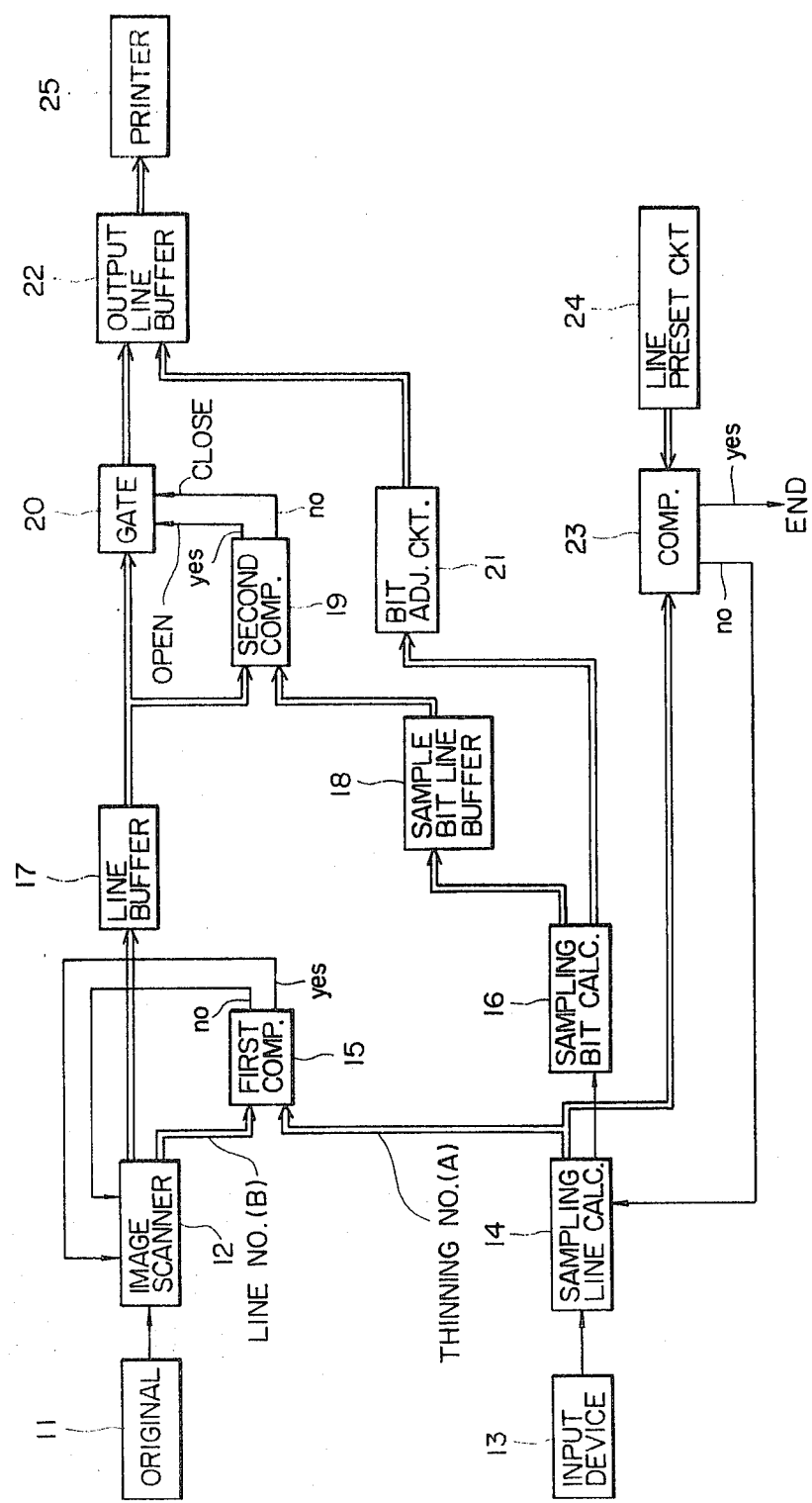
FIG. 7 is a block diagram showing another example of an oblique projection original forming apparatus.

Another example of an oblique projection original forming apparatus according to the invention is shown in FIG. 7. An input device 13, such as a ten-key unit for inputting, for instance, projection inclination angles, is used to input $\overline{AB} = A$, $\overline{OM} = a$ (FIG. 4), m = tan $\theta$ where $\theta$ is a projection inclination angle, and a reading line density d. A sampling line calculation circuit 14 calculates, utilizing, the numerical values thus inputted, line numbers to be used as data according to equations (1)

and (2), and outputs a sampling line number A. An image scanner 12 reads an orthogonal projection original 10 line-by-line outputting the line number B read.

The line numbers A and B are compared by a first comparison circuit 15. When $A=B$, the comparison circuit 15 outputs a coincides signal YES. As a result, the line having the line number A is read and the data from the line is inputted to a line buffer 17. So long as $A \neq B$, the first comparison circuit 15 outputs a non-coincidence signal NO. As a result, the line number provided by the picture reader 12 is increased by one while the data of the line is eliminated. This operation is repeatedly carried out until the line number A equals the line number B. When the reading of one line has been completed and the data from the line thus read has been stored in the line buffer 17, the sampling line calculation circuit 14 operates a sampling bit calculation circuit 16. The calculation circuit 16 performs calculations according to equations (3) and (4) to determine what bits in a line should be sampled as data in accordance with which a sampling bit map is formed in a sampling bit line buffer 18. That is, for instance, "1" bits are set at the positions of bits to be sampled. At the same time, the total number of bits sampled in the line is calculated by a bit adjustment circuit 21 in response to which bits corresponding to a half of the total number of bits sampled out of the initial bits are set to "0" in an output line buffer 22.

The contents of the line buffer 17 and the bit line buffer 18 are supplied bit-by-bit to a second comparison circuit 19 which compares the two. When they coincide, the second comparison circuit 19 applies a coincidence signal YES to a gate circuit 20 to open the gate circuit 20 after which one bit is inputted to the output line buffer 22. When there is no coincidence, the second comparison circuit 19 applies a non-coincidence signal NO to the gate circuit 20 closing the gate circuit 20 so that one bit is eliminated.

This operation is repeatedly carried out until the line buffer 17 has been emptied and all bits to be used are supplied to the output line buffer 22. Upon completion of the processing of each line, the output line buffer outputs the data of the line wich is applied to a printer 25.

The total number of lines used in reading the original is set in a line preset circuit 24 by inputs switches (not shown) in advance. The sampling line number outputted by the sampling line calculation circuit 14 is applied to a comparision circuit 23 also which compares it with a preset value outputted by the line preset circuit 24. When the preset value is larger than or equal to the sampling line number, a signal NO is provided by the comparison circuit. As a result, the sampling line calculation circuit 14 is again operated, the original is read, and the above-described operation is repeated. When the preset value is smaller, then the comparison circuit provides a signal YES which causes the operation to be suspended. Control of the apparatus is effected by a control circuit (not shown).

Figure 8B:
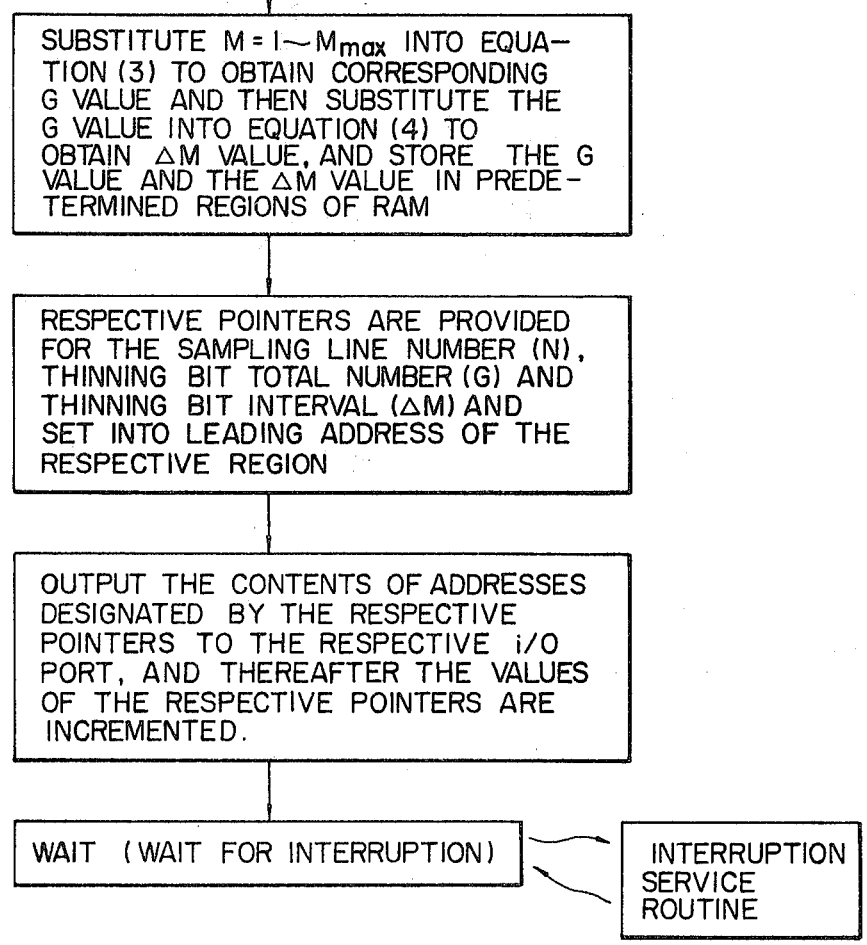
FIGS. 8($a$) and ($b$) comprise a flow chart for a microprocessor used in FIG. 7.

The sampling line calculation circuit 14 and the sampling bit calculation circuit 6 are preferably implemented by a microprocessor such as a type 8080 microprocessor. A flow chart for operating the microprocessor is shown in FIG. 8. The line preset circuit 24 may be implemented by a set of digital switches which is coupled through a BCD-to-binary converter to the input of the comparison circuit 23.

In the above-described examples, the process is carried out on a line-by-line basis, the process may also be carried out on a plural line basis. Furthermore, in the above-described examples, a special input device (such as a ten-key unit) is employed to input the projection inclination data. However, the same effect can be obtained by employing a technique in which a projection inclination input code such as a bar code is provided in a predetermined region of an orthogonal projection original, and it is read by the picture reader.

What is claimed is:

1. An oblique projection original formed by deforming an orthogonal projection original in such a manner that a rectangular original is transformed into a trapezoidal original by compressing said orthogonal projection original by thinning scanning lines in a horizontal direction by calculating line numbers for said orthogonal projection original which are selected as data lines for said oblique projection original, thinning predetermined bits in each scanning line in a vertical direction, compressing each line by reducing first and last portions of each scanning line by half of the number of said bits thus thinned after said predetermined bits are thinned, and inserting white bits at said first and last portions of each scanning line to complete each scanning line.

2. An oblique projection original forming apparatus, comprising:
    first means for reading an orthogonal projection original in a main-scanning direction and a subscanning direction;
    second means for determining, from the total number of read scanning lines and a projection inclination of said orthogonal projection original, read scanning line numbers to be used as oblique projection original data;
    third means for retaining only the data of read scanning lines having said numbers which are determined by said second means;
    fourth means for determining the number of bits to be thinned from the data of each read scanning line according to said angle of inclination, said total number of retained read scanning lines and the number of bits in a vertical direction of said orthogonal projection original;
    fifth means for eliminating a predetermined number of bits from the data of each read scanning line according to the determination of said fifth means; and
    sixth means for shifting the retained bits towards the center of each read scanning line and providing white bits in both end portions of said line thereby to complete each read scanning line.

3. A process for forming an oblique projection original from an orthogonal projection original, comprising the steps of:
    (a) reading an image of said orthogonal projection original having H bits per scanning line in a main-scanning direction and having a total number of scanning lines Nmax in a sub-scanning direction;
    (b) evaluating the value of $$\beta = \tan \alpha = (2am - A)/(2am + A);$$

(c) evaluating $$M\text{max} = \frac{(2am - A)^2 \times N\text{max}}{2\{2a^2m \sqrt{1 + m^2} - (2am - A) \times N\text{max} \times d\}},$$

-continued where $$\overline{SB} = M \times d, \quad \overline{RQ} = N \times d, \quad \overline{SB} = \frac{(2am - A) \times \overline{RQ}}{2\{2a^2m\sqrt{1 + m^2} - (2am - A)\}\overline{RQ}},$$

$m = \tan \beta$ with $\beta$ being the inclination angle of a screen upon which the original is to be projected with respect to the original, d being a reading line density of an original reading device, A being a lengthwise dimension of the undistorted original image perpendicular to said main-scanning direction, a being a distance from a center of a lens used to project said original along a perpendicular line extending from said center of said lens to the edge of said oblique projection original, and $\overline{RQ}$ being a predetermined distance along an edge of said orthogonal projection original;

(d) setting $Mo = 0$;
(e) evaluating $$N = \frac{4a^2m\sqrt{1 + m^2} \times M}{(2am - A)(2am - A + 2 \times M \times d)}$$

with $M = Mo + 1$;
(f) evaluating $$G = \frac{M}{M\max} \times \frac{H}{2}(1 - \beta)$$

with the value M obtained in the previous step;
(g) evaluating $\Delta M = H/2G$;
thinning bits in the N-th line of said undistorted original at intervals of M wherein the number of bits to be thinned is 2G;
(h) shifting the remaining bits in the N-th line toward the center of said line;
(i) inserting G white bits in end portions of said N-th scanning line;
(j) storing the bits for the N-th line thus obtained in a buffer;
(k) determining if M has reached Mmax; and
(l) if M has not reached Mmax, adding one to M and repeating steps (e) through (l) and, if M has reached Mmax, transferring data stored in said buffer to an output device for projecting said original.

* * * * *